United States Patent [19]

Kuitems et al.

[11] Patent Number: 5,685,427
[45] Date of Patent: Nov. 11, 1997

[54] HOLDER FOR REMOVABLY SUPPORTING A COMPACT DISK

[75] Inventors: Timothy H. Kuitems, Orange; Jeffrey M. Smith, Hacienda Heights; Steven R. Anderson, Chino Hills, all of Calif.

[73] Assignee: Ultrapac, Inc., Santa Fe Springs, Calif.

[21] Appl. No.: 642,645

[22] Filed: May 3, 1996

[51] Int. Cl.$^6$ ................................... B65D 85/57
[52] U.S. Cl. .................. 206/310; 206/308.1; 206/309; 206/493
[58] Field of Search ................... 206/309, 308.1, 206/310, 312, 493

[56] References Cited

U.S. PATENT DOCUMENTS

| | | | |
|---|---|---|---|
| 4,793,479 | 12/1988 | Otsuka et al. | 206/308.1 |
| 4,895,252 | 1/1990 | Nomula et al. | 206/312 |
| 5,251,750 | 10/1993 | Gelardi et al. | 206/308.1 |
| 5,494,156 | 2/1996 | Nies | 206/310 |
| 5,526,926 | 6/1996 | Deja | 206/310 |
| 5,586,651 | 12/1996 | Krummenacher | 206/310 |

FOREIGN PATENT DOCUMENTS

| | | | |
|---|---|---|---|
| 3425579 | 1/1986 | Germany | 206/308.1 |
| 2205589 | 8/1990 | Japan | 206/310 |
| 8806559 | 9/1988 | WIPO | 206/308.1 |

*Primary Examiner*—David T. Fidei
*Attorney, Agent, or Firm*—Edgar W. Averill, Jr.

[57] ABSTRACT

A holder for removably supporting a compact disk. The compact disk is held by its center opening over a post and under a ridge on the outer surface of the post. As the top of the post is pushed downwardly, the outer surface of the post moves inwardly and the ridge compresses and moves downwardly and allows the opening in the compact disk to pass over it. The compact disk is thus easily removed by simply pushing the center of the disk holding post. Preferably, the grooves are spiral shaped.

23 Claims, 6 Drawing Sheets

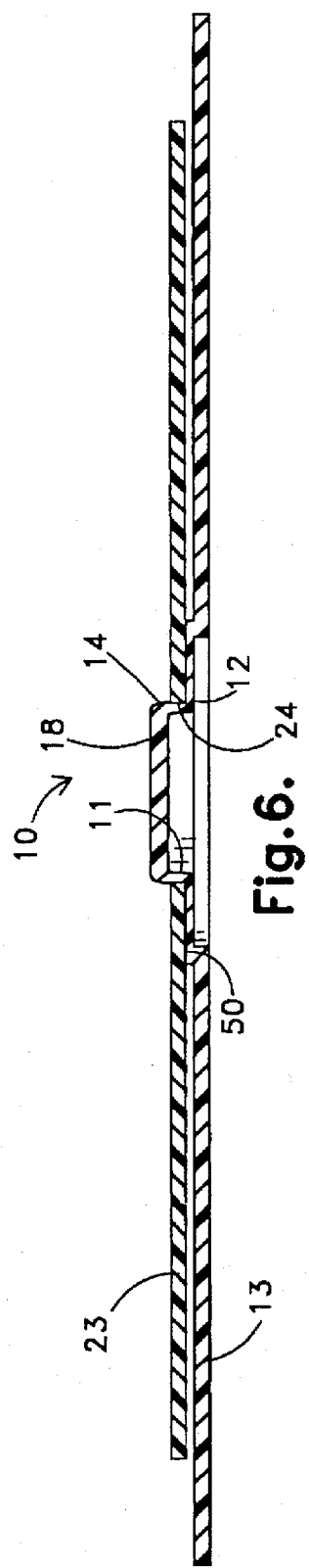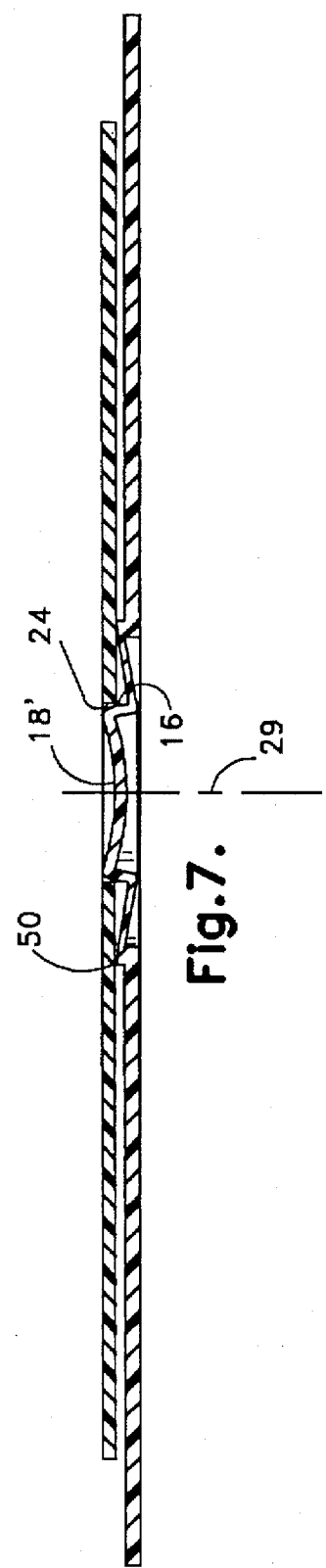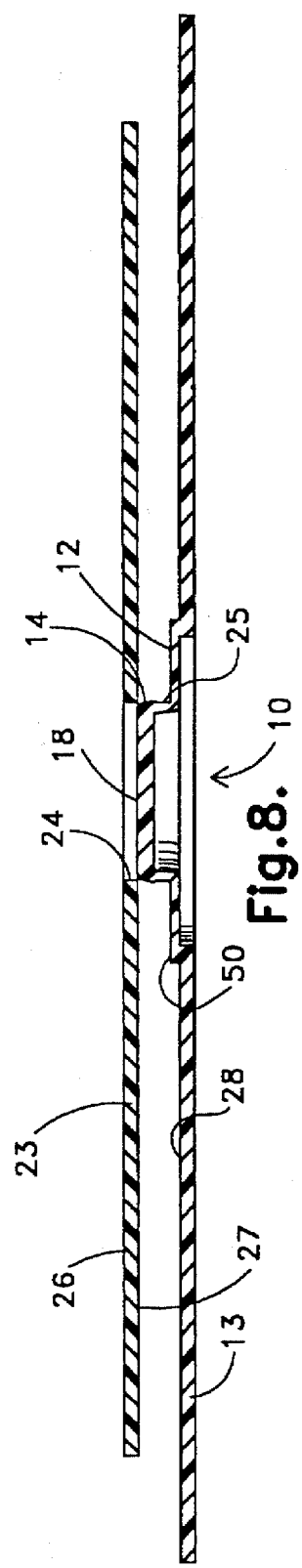

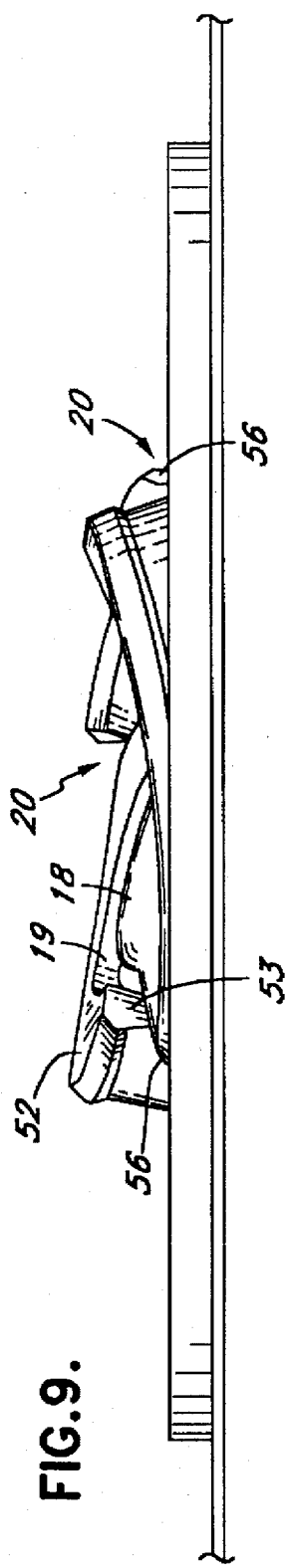
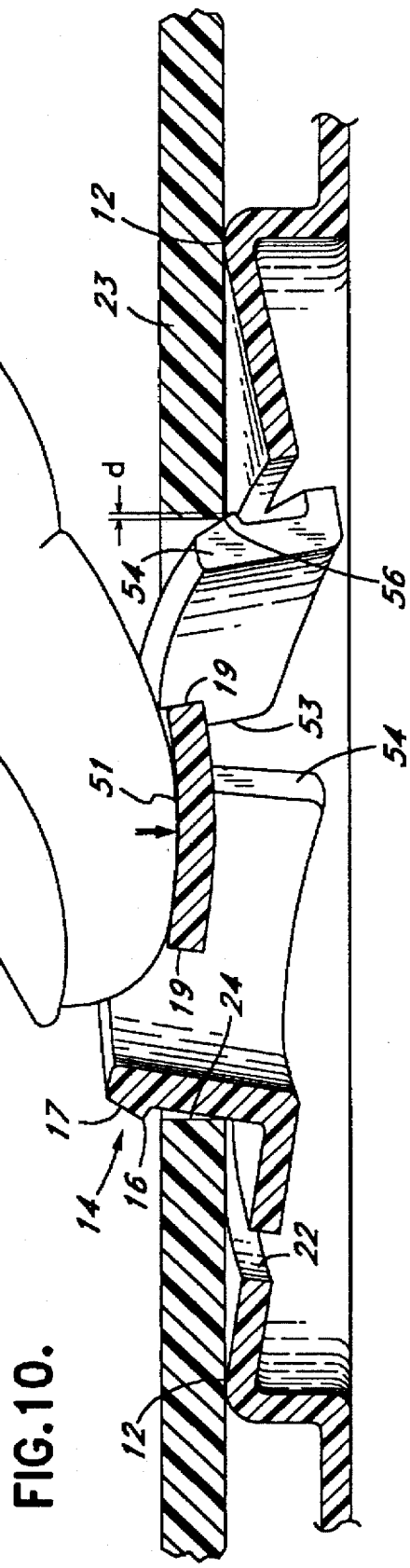
FIG. 9.
FIG. 10.

HOLDER FOR REMOVABLY SUPPORTING A COMPACT DISK

BACKGROUND OF THE INVENTION

The field of the invention is devices for holding compact disks or other flat typically circular objects with a circular opening. Compact disks or laser disks are increasing in popularity. They have reached a dominant position in the recorded music area and are rapidly growing in the field of computer data storage and computer program storage and retrieval. The typical compact disk has an outside diameter of about 12 mm and a typical inside diameter of 1.5 mm. A currently dominant package for holding compact disks is referred to as a "jewel case". The compact disk is held by a plurality of cantilevered arms formed in a removable insert. One patent showing such holder is U.S. Pat. No. 4,535,888. Attempts have been made to provide a low-cost disk holder and one that permits the user to remove the disk by pressing in the center of the holder. One such approach is shown in U.S. Pat. No. 4,895,252 where a central hub 20 basically in the shape of a flat topped dome may be depressed to facilitate the removal of the disk. The device is designed so that the central hub is supported both from below and from above in a receptacle.

Another approach is shown in U.S. Pat. No. 4,793,479 where the pushing of a central button withdraws connecting pieces and tilts four levers which lift the disk above the withdrawn connecting pieces. Such design appears expensive to produce and fragile.

Another lever utilizing approach is shown in U.S. Pat. No. 5,251,750. Again, the design appears expensive and fragile.

A CD holder made from a brittle clear plastic such as styrene has two molded sides which help prevent the breaking of the brittle plastic center. It has no removal feature other than the common prying up by an edge.

A vacuum formed device for removably holding a compact disk is shown in U.S. patent application Ser. No. 08/548,558 assigned to the assignee of the present invention. While ideal for a vacuum formed holder, the process of vacuum forming somewhat limits the volume of production and larger numbers of units may be more economically produced by injection molding. An injection molded unit has been prepared which is capable of releasing a compact disk by pressing the center portion of the disk holder. This unit has four cantilevered arms which provide an elastic upward pressure on a compact disk which is held by two semi-circular members held on flexible arms. When these two members are pressed downwardly, they also move inwardly and allow the flexible members to press the disk away from the holder. This design has a disadvantage of placing a continuous upward pressure on the compact disk as it is being held. It also requires a deeper box than the conventional jewel case.

It is important that a compact disc holder be configured so that it requires a minimum of height so that disks can be stored close to one another. It is also important that the compact disk be securely held so that it does not become dislodged during shipping or when the holder is dropped. It is also important that the disk be removed without having to pry it up from its outer edge which is the common method of removing the compact disc shown in U.S. Pat. No. 4,535,888.

BRIEF SUMMARY OF THE INVENTION

It is an object of the present invention to provide a secure holder for a compact disk which takes only a minimum amount of vertical height while permitting the compact disk to be removed simply by pressing in the center of the holder.

The present invention is for a holder for removably supporting a compact disk. The compact disk has a central opening. The holder will be described in a horizontal position such as when it is lying on the top of a table with the understanding that this description is merely to facilitate the description of the position of various parts of the unit. The unit, of course, will work in any orientation. The holder has a generally horizontal base which includes a compact disk contact member. A contact disk support post extends upwardly from the horizontal base and has a vertical central axis and an outer peripheral surface and the outer peripheral surface contacts the opening in the compact disk. A peripheral ridge extends around the support post near the top of the post to hold the disk in place. At least three slots are formed from the horizontal base into the compact disk support post past the peripheral ridge and extending into the top of the post. The slots are positioned so that the top of the post has a plurality of contiguous paths from the outer edge of the top of the post to an opposite portion of the outer edge of said top. When the top is pressed downwardly, the peripheral ridge moves toward the vertical central axis of the post and also moves downwardly. The lower surface of the compact disc contacts the compact disk contact member of the base and the peripheral ridge passes downwardly through the opening in the compact disk allowing it to pop out of the holder. Preferably, there are three slots which extend into the horizontal base to increase the flexibility of the base and also to permit the post to contract toward its central axis. A particularly useful design results from forming the slots in a spiral shape.

BRIEF DESCRIPTION OF THE DRAWINGS

FIG. 6 is a cross-sectional view showing the holder of FIG. 1 supporting a compact disk.

FIG. 7 is a cross-sectional view showing the holder of FIG. 1 with the top of its support post being depressed.

FIG. 8 is a cross-sectional view showing the holder of FIG. 1 having ejected a compact disk.

FIG. 9 is a side view of the holder of FIG. 1 in a depressed configuration.

FIG. 10 is a cross-sectional view of the holder of FIG. 9, including a compact disk.

DESCRIPTION OF THE PREFERRED EMBODIMENTS

Figure 1:
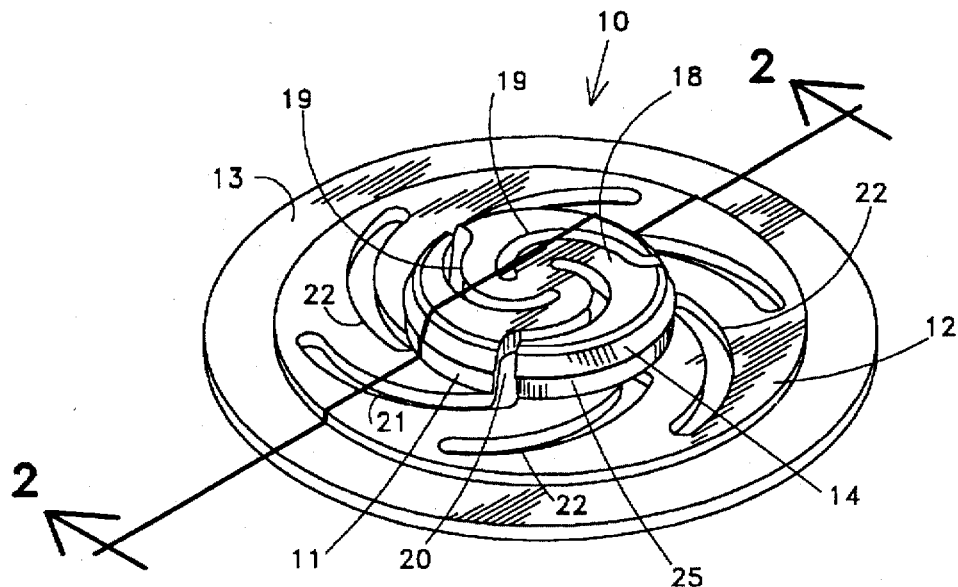
FIG. 1 is a perspective view of the central portion of the holder of the present invention.

The holder for removably supporting a compact disk is shown in perspective view in FIG. 1 and indicated generally by reference character 10. Holder 10 has a compact disk support post 11 which rises generally vertically from a compact disk contact member 12 which is a part of generally horizontal base 13.

Compact disk support post 11 has a peripheral ridge means 14 which is shown in cross-sectional view in FIG. 2 where it can be seen to have an upper edge 15 and a lower edge 16 with a steep slope 17 there between to facilitate the insertion of a compact disk as described more fully below. Support post 11 has a top 18 which is shown as a generally flat top, although it could, of course, be slightly depressed. Top 18 is shown with three identical spiral slots 19, each of which are intersected by a radial slot 20 which extends through peripheral ridge means 14 and compact disk support post 11 and extends into the generally horizontal base 13 where it is indicated by reference character 21. Three spiral slots 22 are formed entirely in the generally horizontal base 13 and more specifically in the raised CD contact member 12 which forms a portion of the generally horizontal base 13.

Figure 2:
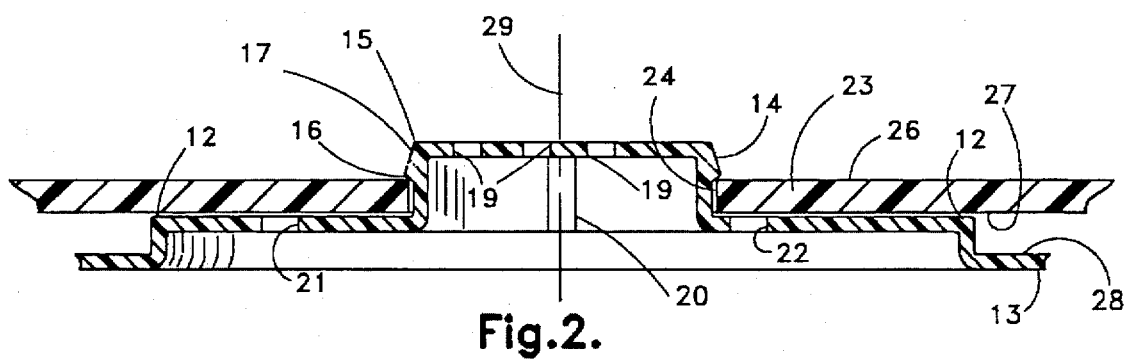
FIG. 2 is a cross-sectional view taken along line 2—2 of FIG. 1 further including a portion of a compact disk.

As shown in FIG. 2, a compact disk 23 has a central opening having an inwardly facing circular edge 24. When the compact disk is being held by holder 10, this edge 24 contacts the outer peripheral surface 25 of support post 11 and is securely held thereby. In this position the outer peripheral surface 25 is under slight outward pressure against the central opening of the compact disk. In this way the compact disk does not move, vibrate or otherwise turn during shipping or storage compact disk 23 has an upper surface 26 and a lower surface 27. As also shown best in FIG. 2, the generally horizontal base 13 has a lower portion 28 which is under the recorded portion 27 of contact disc 23. In this way, any contact between horizontal base 13 and lower surface 27 is only in that portion within the compact disk contact member 12 which does not contain any recorded material and cannot be damaged by any incidental contact with the holder.

Figure 3:
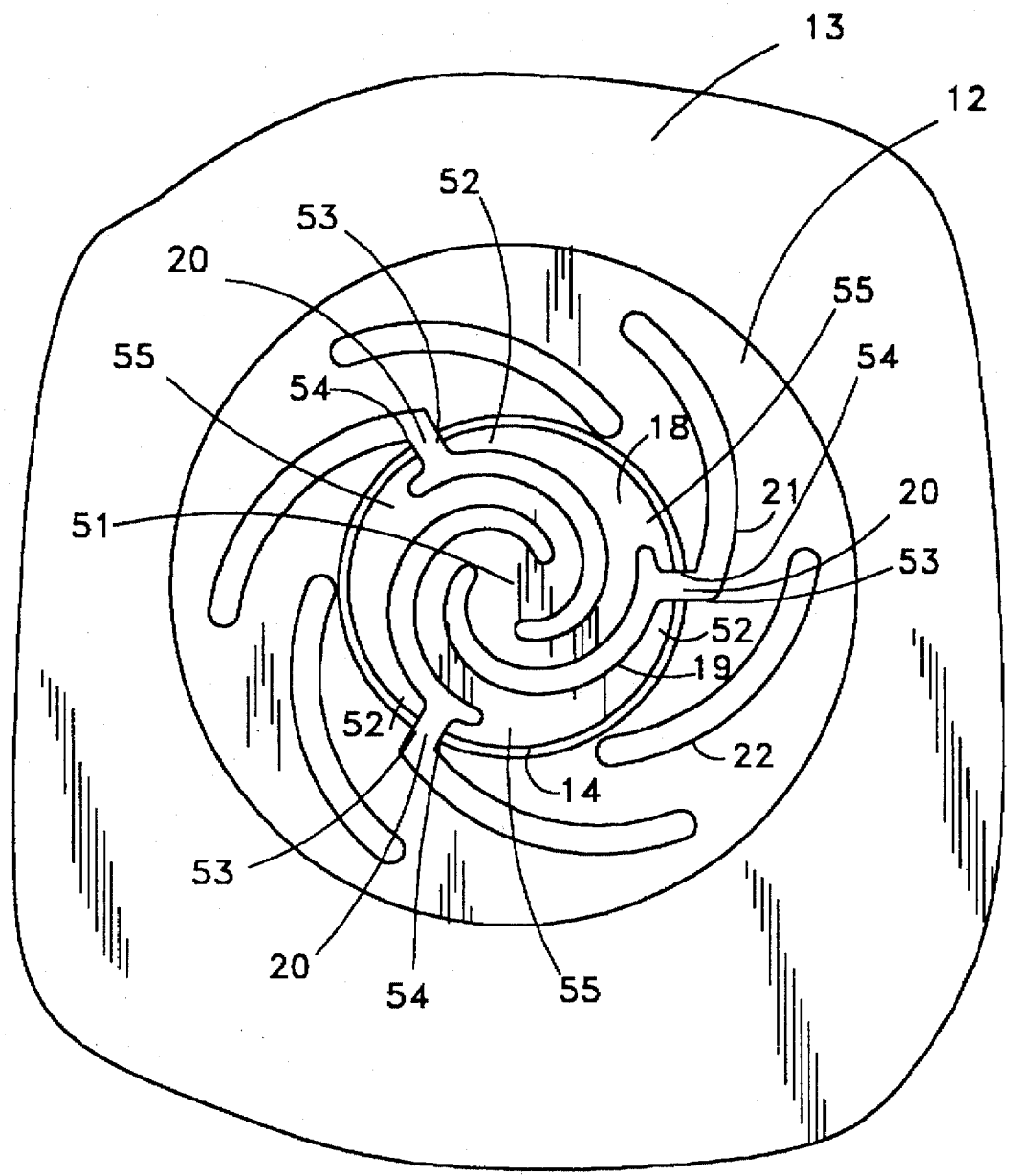
FIG. 3 is a plan view of the holder of FIG. 1.

A top view of holder 10 is shown in FIG. 3 where the orientation of grooves 19 and 22 can be more clearly seen. While the grooves can be formed in shapes other than spirals, the spiral configuration provides an excellent combination of flexibility and user comfort. When a user wishes to remove a compact disk the user presses a finger against top 18 which has a generally smooth surface and can be comfortably depressed. This action is shown in detail in FIG. 7 and will be described below.

Figure 4:
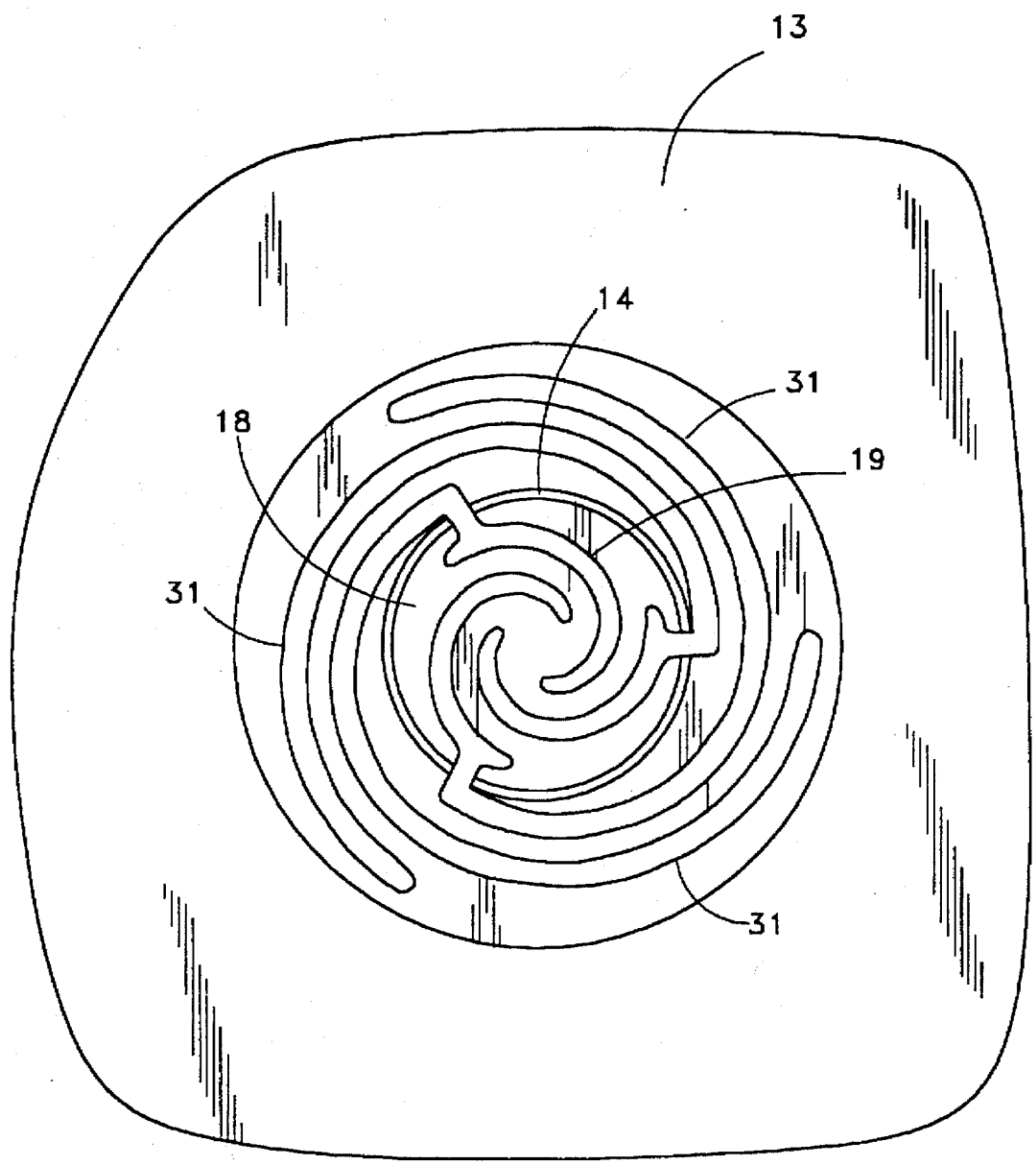
FIG. 4 is a plan view of an alternate embodiment of the holder of FIG. 1.
Figure 5:
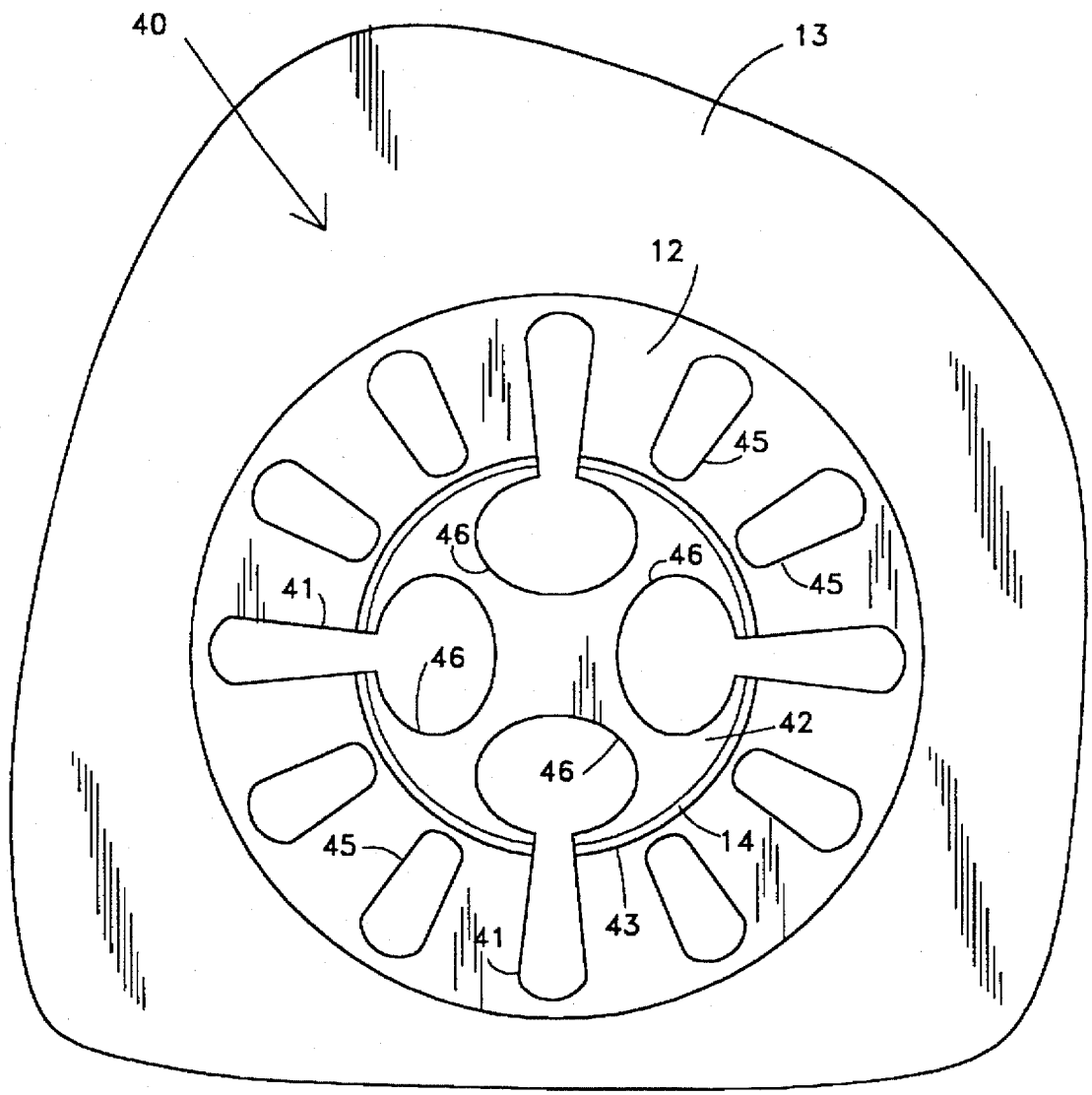
FIG. 5 is a plan view showing an alternate embodiment of the holder of FIG. 1.

An alternate configuration is shown in FIG. 4 and indicated generally by reference character 30. Holder 30 has many of the same features and the same reference characters are used as that for holder 10. The spiral slots which are located entirely within the horizontal base have been eliminated in favor of larger continuations of the grooves in the top which are indicated by reference character 21 in FIG. 1 and are indicated by Reference Character 31 in FIG. 4. A still further alternate configuration is shown in FIG. 5 and indicated by reference character 40. Holder 40 does not have any spiral grooves and instead utilizes radial grooves of two types. One set of grooves 41 extends from the top 42 of support post 43 to a large opening 46. A second set of grooves 45 are located entirely in the compact disc contact member 12 of horizontal base 13. The large openings 46 are formed in top 42 and provide increased flexibility of the top as the center of the top is pressed downwardly.

The CD release action of the holder of the present invention is shown best in FIGS. 6, 7 and 8. The holder of FIG. 1 is shown supporting compact disk 23 in FIG. 6. Holder 10 is shown in a depressed configuration in FIG. 7. It can be seen that the circular edge 24 of the central opening of compact disk 23 is now positioned above the lower edge 16 of peripheral ridge means 14. The grooves 19 (not shown in FIGS. 6, 7 and 8) permit the axially movement of ridge means 14 toward central axis 29. The top 18 curves downwardly by pressure of the user's finger and the depressed top is indicated by 18'. This inward movement is also caused by the cantilevered support of the ridge 14 on the CD contact member 12. Of course, CD contact member 12 could further include a small outer ridge to create a specific ring of contact, but as the horizontal base 13 inside of the outer edge 50 of compact disk contact member 12 contacts only portions of the lower surface 27 which is not recorded, such a ridge is generally not necessary.

The compact disk is shown completely removed in FIG. 8. In order to place a compact disk in holder 10, one merely needs to place the central opening 24 of disk 23 over the top of peripheral ridge 14 which is smaller than opening 24. One then merely presses the disk downwardly in a manner almost identical to that used for a conventional jewel case holder and the disk snaps into place. The contact of the inner opening 24 with the shaped surface of ridge 14 compresses the ridge allowing the easy insertion of the disk into the holder.

The operation of a preferred embodiment of the holder of the present invention utilizes a camming action between the lower edge 16 of peripheral ridge means 14 and the central opening 24 of the compact disk 23. Thus, as the top 18 is pressed downwardly, the lower edge 16 of ridge 14 tends to move inwardly because of its contact with the opening 24. Because of this slight outward pressure, as soon as the maximum outer diameter of ridge 14 has passed below the lower edge of central opening 24 of the compact disk, it moves outwardly slightly to hold the compact disk against steep slope 17. This prevents the action which would occur if the ridge were to completely retract and move downwardly. As soon as the downward pressure on top 18 was removed the ridge would tend to move upwardly within the opening 24 of the compact disk without causing the compact disk to raise above the contact member 12. Thus, in use there is a slight clicking action as the ridge passes through the disk and grasps the underside of the disk. This action is very slight but is sufficient to cause the compact disk to raise.

The holder of the present invention is preferably injection molded from high impact polystyrene. It can be shaped to fit within a conventional jewel case to replace the present cantilevered arms of the type shown in U.S. Pat. No. 4,535,888.

While not wishing to be bound by any theory, it is believed that the spiral grooves function to perform several movements in the outer ridge. Referring to FIGS. 3, 9 and 10 as the center 51 of top 18 is depressed by the user's finger, the entire top tends to curve inwardly and flex downwardly as shown best in FIG. 7. However, the existence of the spiral grooves affects the movement of ridge 14 differently at different areas. Slots 20 have two edges. One edge 53 is adjacent the inward movement area 52 and the other edge 54 is adjacent an area 55 which because of its location with respect to spiral grooves 19 tends to move inwardly toward the central axis less than the edge 53. In this way there are three portions of ridge 14 which are in effect forced outwardly as compared to the other edge of the ridge. Thus, the portion of ridge 14 adjacent edges 54 is moved inwardly more by a camming action of the opening of the compact disk than by a hinging action such as the portion of ridge adjacent edge 53. As the result, in use these three portions of ridge 14 adjacent edge 54 tend to snap outwardly a distance "d" on FIG. 10 when they have passed through the opening in the compact disk and in effect hold the compact disk so that as pressure is released on top 18 these lift portions of ridge 14 adjacent edges 54 tend to lift the compact disk and do not permit it to fall again below ridge 14. That is, the greater part of ridge 14 in a preferred configuration remain retracted inside the opening of the compact disk as pressure is beginning to be released on center 51 and the disk rises by contact with the lift portions 56 of ridge 14 adjacent edges 54 without being restrained by the portion of ridge 14 away from the edges 54.

The holder of the present invention can be used in a conventional "jewel case" simply by forming the horizontal base 13 in a rectangular shape which fits within the conventional jewel case. The compact dish 23 can still be removed in the conventional manner of prying it up from the outer edge, but can far more simply be removed by depressing the top 18 of compact disk support post 11. The holder of the present invention can be economically manufactured from polymer such as impact polystyrene and can be readily manufactured by the process of injection molding for maximum economy. The result is a very secure support of a compact disk during shipping and yet the very easy removal by a relatively light pressing of top 18.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

We claim:

1. A holder removably supporting a compact disk, said compact disk being of the type having an upper surface, a lower surface, an outer periphery, and a central opening having an inwardly facing circular edge, said holder and disc comprising:

a compact disk;

a holder comprising:
 a generally horizontal base including a compact disk contact member;
 a compact disk support post extending upwardly from said horizontal base, said compact disk support post having a vertical central axis, an outer peripheral surface and an inner peripheral surface with a wall therebetween and at least a portion of the outer peripheral surface contacting the inwardly facing circular edge of said compact disk, said support post having a top having an outer edge;
 peripheral protrusions extending outwardly with respect to the outer peripheral surface of said compact disk support post at a location above the inwardly facing circular edge of the central opening of said compact disk, said peripheral protrusions having an upper edge and a lower edge; and
 at least three slots formed through said wall of said support post extending upwardly from said horizontal base into said compact disk support post, past said peripheral protrusions and extending into said top, said slots being positioned so that the top has a plurality of continuous paths from the outer edge of the top to an opposite portion of the outer edge of the top and said ridges and said top being configured to permit the downward movement of a central portion of said top whereby when the top is pressed downwardly, at least a portion of the peripheral protrusions moves toward the vertical central axis of said compact disk support post and downwardly and the lower surface of the compact disk contacts said compact disk contact member of said base and at least a portion of the peripheral protrusions passes downwardly through the inwardly facing edge of said compact disk causing the compact disk to pop off the compact disk support post without the necessity of any upwardly directed force.

2. The holder of claim 1 wherein said compact disk support post is hollow.

3. The holder of claim 1 wherein there are three slots.

4. The holder of claim 1 wherein a portion of said slots in the top of the compact disk support post are spiral slots.

5. The holder of claim 4 wherein said at least three slots continue into said horizontal base.

6. The holder of claim 5 wherein there are base slots formed in said horizontal base between said at least three spiral slots.

7. The holder of claim 1 wherein said disk contact surface is located on a raised step in said base.

8. A holder for removably supporting a compact disk, comprising:

a horizontal base including a raised, flexible compact disk contact member having an open area underneath said contact member and having an outer portion which resists downward movement and an inner portion that permits downward movement;

a hollow compact disk support post extending upwardly from said compact disk contact member, said compact disk support post having a vertical central axis, an outer peripheral surface and an inner peripheral surface with a wall therebetween, said support post having a top having an outer edge;

peripheral protrusions extending outwardly from the outer peripheral surface of said compact disk support post below the outer edge of the top, said peripheral protrusions having an angled upper edge extending outwardly from the support post and a lower edge; and at least two slots formed through said wall of said support post extending from said contact member upwardly into said compact disk support post, past said peripheral protrusions and extending into said top, said slots being positioned so that the top has a plurality of continuous paths from an edge of the top to an opposite edge of said top and said ridges and said top being configured to permit the downward movement of a contact portion of said top and said raised, flexible compact disk contact member being configured to flex downwardly adjacent said post whereby when the top is pressed downwardly, at least a portion of the peripheral protrusions moves toward the vertical central axis of said compact disk support post and at least a portion thereof moves downwardly below the outer portion of the contact member so that a compact disk supported by said holder will pop off the compact disk support post.

9. The holder of claim 8 wherein there are three slots.

10. The holder of claim 9 wherein said slots are spiral shaped slots.

11. The holder of claim 10 wherein said spiral shaped slots continue into said compact disk contact member outwardly to a position near said compact disk contact member.

12. The holder of claim 11 wherein there are base slots formed in said compact disk contact member between said spiral slots.

13. The holder of claim 8 wherein the protrusions have a portion which moves downwardly before another part of said protrusions when said top is pressed downwardly.

14. The holder of claim 10 wherein each of said spiral shaped slots has a top portion formed in the top of the compact disk support post and the top portion of each spiral shaped slot has an outer terminus near the outer edge of the top and an inner terminus nearer the central axis than the outer terminus.

15. The holder of claim 14 wherein each top portion of each spiral shaped slot is intersected by a radial slot extending through said outer peripheral surface of said compact support post at a position separated from said inner terminus.

16. The holder of claim 15 wherein each top portion of each spiral slot is intersected by a radial slot at a position nearer said outer terminus than said inner terminus.

17. The holder of claim 8 wherein there are two sets of slots a first set extending along said contact member and extending into said top and a second set of slots positioned only in said contact member.

18. The holder of claim 17 wherein there are three of said first set of slots and three of said second set of slots.

19. The holder of claim 18 wherein both sets of slots have spiral shaped portions.

20. A process for removing a compact disk from a holder, the holder having a center post with a top and an outer edge with protrusions thereon and said compact disk having a central opening with an upper edge below said protrusions and a bottom edge and an inwardly facing edge between the upper and bottom edges of the disk, said process comprising:

pressing downwardly on the top of the center post an amount sufficient to pass at least a portion of the protrusions through the central opening and past the bottom edge of the opening at least a portion of said protrusions riding along said inwardly facing edge and said at least a portion of said protrusions moving outwardly below said bottom edge;

releasing the top of the center post to capture the opening of the compact disk at the bottom edge of said central opening by at least a portion of the protrusions; and removing the resulting loose compact disk from the center post.

21. The process of claim 20 wherein a portion of the protrusions is forced inwardly by contact with the opening in said compact disk.

22. A compact disk holder holding a compact disk comprising:

a compact disk having an upper surface, a lower surface, a central opening with an inner surface having an upper edge and a lower edge;

a disk holding post having a top surface and a peripheral surface contacting at least a portion of said inner surface of said central opening of said compact disk, said disk holding post having protrusions above the upper surface of said compact disk when said disk holding post is holding a compact disk and said protrusions positioned around at least a portion of said peripheral surface and at least a portion of said protrusions comprising a lift portion having a sloped upper surface;

at least one slot in said disk holding post passing from above said protrusions to below said protrusions; and a platform supporting said disk holding post so that the disk holding post will, at least in part, move downwardly when the top surface of the post is pushed downwardly, said platform having an outer disk resisting surface, said post being configured to cause at least a said lift portion of the protrusions to move downwardly and inwardly by contact with the inner surface of the central opening when the top surface of the post is depressed and to move outwardly when the lower edge of said central opening is passed by the downward movement of said lift portion of the protrusions and said compact disk being lifted by the outward movement of said lift portion as downward pushing of the post is released thereby permitting the disk to be easily removed from the holder.

23. The compact disk holder and compact disk of claim 22 wherein there are three lift portions.

* * * * *